Figure 1:
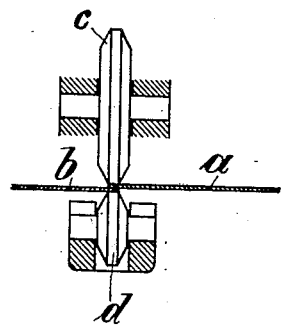

N. PRÖSTLER.
METHOD OF UNITING SHEETS OF BRASS, ALUMINIUM, AND OTHER METALS OF HIGH CONDUCTIVITY FOR HEAT.
APPLICATION FILED NOV. 11, 1912.

1,126,655.

Patented Jan. 26, 1915.

Witnesses
Frédéric Müller
Wilhelm Kummerer

Inventor
Norbert Pröstler

UNITED STATES PATENT OFFICE.

NORBERT PRÖSTLER, OF BERLIN, GERMANY, ASSIGNOR TO GESELLSCHAFT FÜR ELEKTROTECHNISCHE INDUSTRIE MIT BESCHRÄNKTER HAFTUNG, OF BERLIN, GERMANY, A CORPORATION OF GERMANY.

METHOD OF UNITING SHEETS OF BRASS, ALUMINIUM, AND OTHER METALS OF HIGH CONDUCTIVITY FOR HEAT.

1,126,655.     Specification of Letters Patent.     Patented Jan. 26, 1915.

Application filed November 11, 1912. Serial No. 730,737.

*To all whom it may concern:*

Be it known that I, NORBERT PRÖSTLER, engineer, a subject of the King of Bavaria, residing at Berlin, in the Empire of Germany, have invented a certain new and useful Improved Method of Uniting Sheets of Brass, Aluminium, and other Metals of High Conductivity for Heat, of which the following is a specification, reference being had therein to the accompanying drawing.

My invention relates to a method of uniting thin sheets of brass, German silver, aluminium and other metals or alloys of high conductivity for heat, that is of a higher heat conductivity than iron. Now, brass being a typical representative of materials of the above mentioned class I wish it to be well understood that, when in the following specification and claims I shall speak of brass for more simplicity, all other alloys or metals having the same properties as to conductivity for heat will be meant as equivalents for brass.

As is well known, it is old to weld together sheets of iron, steel or other iron alloys with the help of the electric resistance welding method and to produce articles of sheet metal in this manner. Such welded sheet metal articles in comparison with articles having riveted or folded joints, or joints soldered by means of special soldering means or fluxes, show the great advantage of being of greater mechanical resistance and also of having a pretty smooth surface. Moreover, the manufacture of such articles is relatively simple and in consequence thereof comparatively cheap.

According to the known resistance welding method the welding is performed in such a way that the sheet iron parts to be united are caused to overlap more or less at their edges, the overlapping parts are then subjected to pressure, and, while maintaining the pressure, the electric current necessary for producing the welding temperature is passed across said overlapped metallic parts. In the art, however, all attempts to also electrically unite overlapping sheets of metals or alloys such as brass having a greater conductivity for heat than iron, especially thin sheets up to 2 millimeters in thickness, remained without success. On trying to unite such sheets of metal with the help of a normal welding apparatus, the material situated between the electrodes, when the welding temperature is reached, is generally thrown away from the place where the welding is effected, or at least deep depressions are formed in the relatively weak metal, so that it is not possible to obtain in this manner a joint of neat appearance and answering in strength to practical purposes. If a current of lower intensity be used with the object of avoiding the above mentioned drawback, no union of the metals is obtained at all.

The great difficulties which have been experienced in attempting to unite sheets of brass or the like with the help of the known electric resistance welding method are principally due to the following reasons: The above mentioned metals or alloys have a small electrical resistance owing to their great conductivity for electricity, so that more current is needed in order to bring them to a high temperature than in the case of iron or steel, and the electric resistance is still lessened on the pressure between the parts to be welded being augmented. Further, brass and other similar metals or alloys being good conductors for heat, the same have a pronounced tendency to conduct off the heat generated by the electric current, said tendency being increased the more the contact between the meeting metallic surfaces become perfect owing to greater electrode pressure. However, before all, it is to be considered that the above mentioned materials such as brass pass within a very small interval or range of temperature from a solid into a liquid condition, while iron and steel, when the temperature is raised, become but very gradually soft and more and more plastic before passing into the liquid condition. This accounts for the facility with which iron and steel are electrically welded in comparison with the union of sheets of brass and the like.

Based upon the above considerations the process forming the object of the present invention consists in uniting or fastening together sheets of brass or other equivalent alloys or metals, such as German silver, aluminium having a higher heat conductively than iron by using an electrode pressure perpendicular to the surface of the overlapping sheets of brass or similar material, said electrode pressure not exceeding 30 kilograms (about 66 lbs.) Under these circumstances the contacting pieces of metal are fused or melted together rather than welded according to the real meaning of this word. Consequently, the present new process may be more properly termed a process of fusing or melting together metals than a welding process proper.

Practically I use according to my process for effecting the union a pressure as small as compatible with the elasticity of the materials, such as sheets of brass, to be welded, so as to just bring the metallic parts into contact with each other. For uniting brass sheets of 0.5 mm. thickness for example a pressure of 10-15 kilograms (about 22-33 lbs.) is used according to the present process. When spot welding electrodes are used, which, as is well known in the art, are pin-shaped, the contacting or pressing surface of such electrodes for an electrode-pressure from 15 to 30 kg. ranges between 2 and 5 millimeters breadth for the different thicknesses of sheet metal which vary about between 0.5 millimeter and 2 millimeters thickness over all. In other words, the electrodes may have a diameter from 2 to 5 millimeters. In case of roller-electrodes for overlapped or butt seams welded sheet-metal work the rollers are given a breadth or width from 2 to 4 millimeters and a diameter from 50 to 100 mm. By using such small electrode pressure the transition resistance at the place to be welded is considerably increased, whereby the development of heat at said place is correspondingly enhanced. At the same time, owing to the small electrode pressure, the conducting off of heat from the metallic sheets in contact toward the back of the electrodes is diminished to a great extent and consequently a sticking of the work pieces to the electrodes is rendered impossible. Further physical phenomena which are not exactly understood at present also seem in connection with the explained way of performing the process to account for the success obtained.

The new process may be carried out in different manners as shown by way of examples in the accompanying drawing forming a part of this specification.

Figure 2:
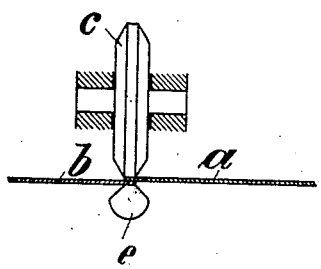
Figure 3:
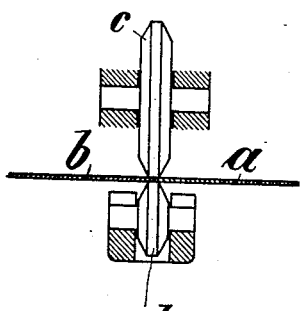
Figure 4:
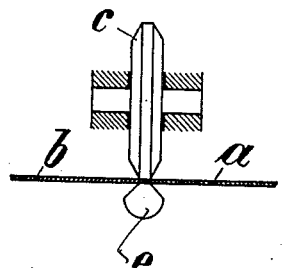
Figure 5:
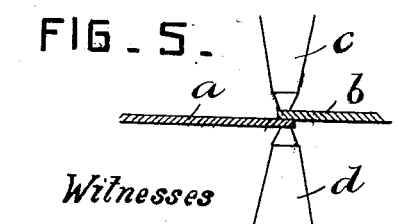
Figure 6:
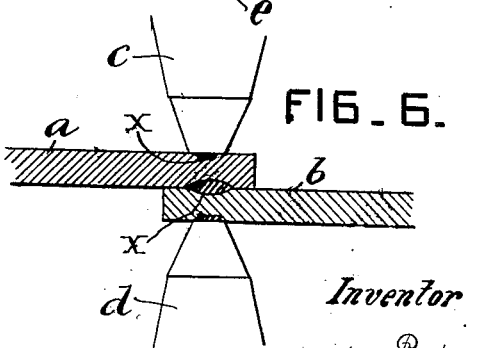

Figure 1 shows the uniting of two overlapping sheets of brass or equivalent material by means of two electrode-rollers. Fig. 2 represents the uniting of two overlapping sheets of brass or equivalent material by means of an upper electrode-roller and a lower rod-shaped electrode. Fig. 3 illustrates the uniting of two sheets of brass or equivalent material abutting with their lateral edges by means of two electrode rollers. Fig. 4 shows the uniting of two sheets of brass or equivalent material with abutting lateral edges by means of an upper electrode roller and a lower rod-shaped electrode. Figs. 3 and 4 illustrate the subject-matter of a divisional application, Serial No. 862,261, filed September 19, 1914. Fig. 5 represents the uniting of two overlapping sheets of brass or equivalent material by means of point electrodes. Fig. 6 is a diagrammatic view of two sheets of brass or the like, and illustrating the electrodes and showing diagrammatically the portions of the sheets which are melted to effect the uniting of the sheets.

The present method in which an electrode pressure not exceeding 30 kilograms (about 66 lbs.) is used may be performed with the help of the usual point or spot welding electrodes. In this case, the union of the metallic sheets is only effected in small areas separated by areas not in actual contact as in the ordinary point welding.

Fig. 5 shows overlapping sheets of brass $a$ and $b$; $c$ and $d$ are ordinary spot welding electrodes. The special electrode pressure is applied and maintained during the proper time perpendicularly to the outer flat surface or plane of the sheets.

If seams are to be obtained, the brass sheets $a$, $b$ to be united are brought in overlapped condition between two electrode-rollers $e$, $f$ (Fig. 2) or between an upper electrode-roller $e$ and a lower rod-shaped electrode $g$ (Fig. 3), and the required small electrode pressure is applied transversely to the outer flat surface or plane of the workpieces $a$, $b$, while causing the electric current of proper intensity or bulk to pass across said overlapping parts.

In Fig. 3 the sheets $a$, $b$ of brass or equivalent material are brought between the electrode roller $c$, $d$ so as to meet together or abut with their lateral edges or faces, the uniting operation proper being effected in the same manner, as according to Figs. 1 and 2. As to be seen each roller electrode contacts partly with the edge of the sheet $a$, and partly with the edge of the sheet $b$.

In Fig. 4 the mode of operation and effect is the same as in Fig. 3 with the only difference that an upper electrode roller $c$ and a lower rod-shaped electrode $e$ are provided for performing the uniting process.

For a proper understanding of this present method it must be clearly appreciated that the action of brass and similar metals or alloys under high temperatures is quite different from the action of steel and iron, in that the latter assume a plastic condition before becoming liquid under the influence of high temperatures, and in the welding of steel and iron by what is known as the spot welding process, the resistance of the steel or iron to the passage of the electric current therethrough generates sufficient heat in the steel or iron to bring them to a plastic condition, at which time the pressure from the electrodes welds or unites the plates. In the case of brass and similar metals or alloys however, there is no intermediate or plastic stage of the metal before it reaches a liquid condition, and brass is similar in this respect to lead, in that it is either solid or liquid, and when solid is turned into a liquid condition under the influence of high temperature without first passing through a plastic condition, as is a characteristic of steel and iron. With a proper understanding of this fundamental difference between the action of steel and iron on the one hand and brass and similar metals or alloys on the other, it will become at once apparent that the same process which can be successfully employed for the welding of sheets of steel and iron electrically, as by the spot welding process, can not be employed for the uniting of brass and similar metals or alloys electrically and that the difference in the method employed for the uniting of thin sheets of brass and similar metals or alloys is not a difference of degree, but is essentially a difference of kind or character of the method or process itself, as will be clearly understood from the following, taken in connection with Fig. 6 of the drawing.

In the uniting of thin sheets of brass and similar metals or allows it is essential that the adjacent faces of the sheets be raised to a sufficiently high temperature to become liquid and melt together to produce a joining or union of the plates, and it is equally essential that the body or more properly, the interior portion of the plates just adjacent the contacting surfaces thereof be not raised to a sufficiently high temperature to become liquefied, for if such a liquefied condition exists in the interior of the plates between the electrodes, any appreciable pressure of the electrodes on the plates would instantly displace the liquid metal between the electrodes and result in a hole or aperture through the plates instead of a uniting or joining of the same. It must be therefore understood that in order to effect the joining or uniting of thin sheets of brass or the like the temperature of the contacting surfaces of the plates must be raised to a temperature exceeding that of the temperature of the interior of the plates between the electrodes. Such a condition is brought about by this present process, in that the application of a relatively light pressure of the electrodes on the plates causes what might be termed a slight contact or what is technically called a "poor" contact between the plates themselves when they overlap and between the electrodes and the plates, when the plates abut. This slight contact offers a greater resistance to the passage of the current at the points of contact and localizes the heat generated by said greater resistance at these contacting surfaces of the plates, while the body or interior of the plates offers less resistance to the passage of the current and consequently the said body or interior of the plates is not raised to the same high temperature as the light contacting surfaces. The effect therefore on the plates upon application of a relatively light pressure is that the heat generated by the resistance of the passage of the current at these contacting surfaces being greater than the heat generated in the interior of the plates themselves causes a localized liquefaction of the plates at these contacting surfaces without causing a liquefaction of the metal in the interior of the plates, and adjacent to the contacting surface thereof between the electrodes. The effect of this is that the plates are melted rather than welded together, which melting is localized at the contacting surfaces of the plates and may or may not occur at the point of contact with the electrodes when the plates overlap according to the character of the contact between the electrodes and plates themselves. As a consequence of this a high pressure of the electrodes on brass plates or the like results in no weld or melting of the metal, as whenever the contact between the surfaces of the plates is so intimate as not to offer the proper resistance to the passage of the current to the contacting surfaces, sufficient heat is not generated to cause a melting of the metal. While on the other hand if the current be of such character to cause a melting of the metal under an intimate contact and high pressure of the electrodes, said melting occurs not only at the contacting surfaces of the plates, but in the interior of the plates themselves between the electrodes. The pressure of the electrodes instantly displaces the fluid metal and produces a hole in the plates instead of a union or joining of the same.

From the foregoing it will be seen that the purpose of this present method is really to maintain the plates of brass or like metal or alloy at a sufficiently light contact to produce a melting temperature at the contacting surfaces only and at the same time maintain the interior of the plates at less than a melting temperature.

As distinguishing this method from the method of welding steel and iron electrically it will be understood that it is by no means essential in the welding of steel and iron to treat the same so that the contacting surfaces thereof are at a higher temperature than the interior of the plates between the electrodes, as the heat generated in steel and iron plates is due entirely to the resistance to the passage of current through the steel or iron plates themselves and not to the resistance to the passage of the current at the actual contacting surfaces of the steel and iron plates.

As will be seen from Fig. 6 the localized melting of the contacting surfaces of the plates is indicated by a waved line at $x$, as is also the localized melting indicated by a waved line at directly under the electrodes. The interior of the plates being illustrated in section lines the same as the surrounding portions of the plates.

I claim:—

1. The hereinbefore described process of uniting together thin sheets of metals of a higher conductivity for heat than iron, such as brass and like metals or alloys consisting in bringing together said metallic sheets, exerting perpendicularly to the outer flat surfaces of said sheets an electrode pressure sufficient to produce a slight contact between the plates, and in passing through the plates an electrical current to melt the adjacent contacting surfaces of the sheets.

2. The hereinbefore described process of uniting together thin sheets of metal of a higher conductivity for heat than iron, such as brass and like metals or alloys consisting in bringing together said metallic sheets, exerting perpendicularly to the outer flat surfaces of said sheets an electrode pressure sufficient to cause a relatively slight contact between the adjacent contacting surfaces of the sheets to provide an increased resistance to the passage of an electrical current at the contacting surfaces of the sheets, and effecting the uniting of the sheets by melting the same at their contacting surfaces by passing an electric current through the sheets.

3. The hereinbefore described process of uniting together thin sheets of metal of a higher conductivity for heat than iron, such as brass and like metals or alloys consisting in bringing together said metallic sheets, exerting transversely to the outer flat surfaces of said sheets an electrode pressure sufficient to produce a slight contact between the plates and in passing through the plates an electrical current to melt the adjacent contacting surfaces of the sheets.

4. The hereinbefore described process of uniting together thin sheets of a metal of a higher conductivity for heat than iron, such as brass and like metals or alloys consisting in bringing together said metallic sheets, exerting transversely to the outer flat surfaces of said sheets an electrode pressure sufficient to cause a relatively slight contact between the adjacent contacting surfaces of the sheets to provide an increased resistance to the passage of an electrical current at the contacting surfaces of the sheets, and effecting the uniting of the sheets by melting the same at their contacting surfaces by passing an electric current through the sheets.

5. The herein described process of uniting together thin sheets of brass and like metals or alloys consisting in bringing said sheets together between two electrodes and applying to the said sheets at the electrodes a pressure sufficient to cause a relatively slight contact between the plates to provide an increased resistance to the passage of an electrical current at the contacting surfaces of the plates, and in passing an electrical current from one electrode to the other through the plates to cause a localized melting of the metal at the contacting surfaces of the plates which is the point of increase of electrical resistance to melt the sheets together.

6. The herein described process of uniting together thin sheets of brass and like metals or alloys consisting in bringing together said sheets between two electrodes and in contact therewith, and in maintaining said sheets in a condition of relatively slight contact to produce a greater resistance to the passage of an electrical current at the contacting surfaces of the plates than in the interior thereof, and in passing an electrical current through the plates from one electrode to the other of sufficient strength to cause an increased resistance to the passage of the current at the contacting surfaces of the plates to melt the same.

7. The hereinbefore described process of uniting together thin sheets of brass or like metals or alloys consisting in overlapping said sheets between two electrodes and in contact therewith, and in maintaining said sheets in a condition of relatively slight contact to produce a greater resistance to the passage of an electrical current at the contacting surfaces of the plates than in the interior thereof, and in passing an electrical current through the plates from one electrode to the other of sufficient strength to cause an increased resistance to the passage of the current at the contacting surfaces of the plates to cause a localized melting of the metal at the contacting surfaces of the plates.

8. The hereinbefore described process of uniting together thin sheets of brass and like metals or alloys consisting in overlapping said sheets between two electrodes arranged perpendicularly to the plane of the sheets and in contact with said electrodes, and in maintaining said sheets in a condition of relatively slight contact to produce a greater resistance to the passage of an electrical current at the contacting surfaces of the plates than in the interior thereof, and in passing an electrical current through the plates from one electrode to the other of sufficient strength to cause an increased resistance to the passage of the current at the contacting surfaces of the plates to cause a localized melting of the metal at the contacting surfaces of the plates.

9. The herein described process for uniting together thin sheets of brass or like metals or alloys consisting in overlapping said sheets between two electrodes arranged transversely to the plane of the sheets and in contact with said electrodes, and in maintaining said sheets in a condition of relatively slight contact to produce a greater resistance to the passage of an electrical current at the contacting surfaces of the plates than in the interior thereof, and in passing an electrical current through the plates from one electrode to the other of sufficient strength to cause an increased resistance to the passage of the current at the contacting surfaces of the plates to cause a localized melting of the metal at the contacting surfaces of the plates.

10. The herein described process of uniting together thin sheets of brass or like metals or alloys consisting in bringing together said sheets between two electrodes and in contact therewith, and in applying to the said sheets at the point of contact with the said sheets a slight pressure so as to produce a relatively slight contact between the said sheets and the electrodes, and in passing an electrical current through the said sheets from one electrode to the other to produce a localized melting of the sheets at their point of contact with the said electrodes.

11. The method of uniting thin sheets of brass or like metals or alloys which consists in bringing said sheets together, pressing said sheets together at the places to be united with a relatively light pressure sufficient to make the surfaces contact at those places but light enough to cause sufficient electrical resistance between the contacting surfaces to produce a melting temperature during the passage of an electric current through the same at the said contacting surfaces and passing an electric current through said sheets at the places to be united and thereby melting and so uniting the sheets at said places.

In testimony whereof I affixed my signature in presence of two witnesses.

NORBERT PRÖSTLER.

Witnesses:
  HENRY HASPER,
  WOLDEMAR HAUPT.